US006648962B2

(12) United States Patent
Berke et al.

(10) Patent No.: US 6,648,962 B2
(45) Date of Patent: Nov. 18, 2003

(54) MICRO-GRANULOSE PARTICULATES

(75) Inventors: Neal S. Berke, North Chelmsford, MA (US); Antonio J. Aldykiewicz, Jr., Brookline, MA (US); Noah D. Budiansky, Charlottesville, VA (US); Arnon Bentur, Haifa (IL)

(73) Assignee: W. R. Grace & Co.-Conn., Columbia, MD (US)

( * ) Notice: Subject to any disclaimer, the term of this patent is extended or adjusted under 35 U.S.C. 154(b) by 0 days.

(21) Appl. No.: 09/947,955

(22) Filed: Sep. 6, 2001

(65) Prior Publication Data

US 2003/0089281 A1 May 15, 2003

(51) Int. Cl.[7] .......................... C04B 22/00; C04B 24/00
(52) U.S. Cl. ...................... 106/696; 106/712; 106/724; 106/737; 106/738; 106/802; 106/803; 106/819; 106/823; 524/2
(58) Field of Search ................................. 106/696, 712, 106/724, 737, 738, 802, 803, 819, 823; 524/2

(56) References Cited

U.S. PATENT DOCUMENTS

| 4,142,910 A | 3/1979 | Kraemer et al. ............ 106/97 |
| 4,284,433 A | 8/1981 | Aignesberger et al. ....... 106/90 |
| 5,236,501 A | 8/1993 | Nomachi et al. ........... 106/723 |
| 5,253,991 A | 10/1993 | Yokota et al. ................. 425/6 |
| 5,728,209 A | 3/1998 | Bury et al. ................ 106/819 |
| 5,766,323 A | 6/1998 | Butler et al. ................... 106/2 |
| 6,027,561 A | 2/2000 | Gruber et al. ............. 106/718 |
| 6,245,142 B1 | 6/2001 | Reddy et al. ............... 106/724 |

FOREIGN PATENT DOCUMENTS

| JP | 05303386 | 5/1995 |
| JP | 7138058 A2 | 5/1995 |
| JP | 8012397 A2 | 1/1996 |
| JP | 247705 A2 | 9/2000 |
| WO | 97/05079 | 2/1997 |

Primary Examiner—Paul Marcantoni
(74) Attorney, Agent, or Firm—Craig K. Leon; William L. Baker

(57) ABSTRACT

Substantially hydrated cementitious particulates useful for delivering admixtures and additives into adhesives, coatings, paints, and other matrix compositions such as cement, concrete, masonry, mortar, fireproofing, shotcrete, and others. Preferred embodiments include intermixing at least one admixture, water, and hydratable cementitious binder to provide a substantially hydrated hardened mass and comminuting the hardened mass into particulates. Alternatively, or in addition, one or more admixtures may be coated onto the external surface area of the particulates, which are microscopically granulosic, to provide accurate and high level loading.

26 Claims, 9 Drawing Sheets

Epoxy Coating  Epoxy coating w/ Cement/CaNi $E_{corr} \cong -0.60$ V/SCE    $E_{corr} \cong 0.052$ V/SCE Iron corrosion when $E_{corr} < -0.25$ V/SCE

MICRO-GRANULOSE PARTICULATES

FIELD OF THE INVENTION

The present invention relates to substantially hydrated cementitious particulates, and more particularly to methods and compositions for introducing admixtures into adhesive, coating, fireproofing, and castable matrix coating compositions.

BACKGROUND OF THE INVENTION

An "admixture" is a term of art describing materials, other than hydraulic cement, water, and aggregates used for making concrete or mortar, which are added to the batch before or during its mixing.

Admixtures are used for modifying properties of a concrete or mortar. Reasons for using admixtures include: (1) achieving certain physical properties in the resultant cured concrete; (2) improving concrete quality through successive stages of mixing, transporting, placing, and curing during adverse weather or traffic conditions; (3) avoiding particular problems during concreting operations; and (4) reducing construction or labor costs.

Such admixtures, when provided in the form of water-soluble solids or powders, are mixed into the concrete slurry or pre-slurry water at the point of usage. When provided as ready-to-use liquids. Admixtures are typically used in bulk and dispensed directly batch-by-batch into ready-mix trucks at a mix plant.

Successful use of admixtures depends upon the accuracy with which they are prepared and batched. The batching process requires, for each batch of concrete or mortar, careful weighing or volumetric measurement of ingredients before or during introducing them into the mixer. Inaccuracies in measuring the amount of admixture used can significantly affect the performance or physical properties of the concrete or mortar being batched, and consequently may thwart the purpose of including the admixture in the first instance. The need for accurate measurement of the amount of admixture to be added to the batch is particularly acute where relatively small amounts are required.

Attempts have been made to overcome the difficulties involved in handling, measuring, and dispensing free-flowing fluid, semi-fluid, and solid admixtures. In U.S. Pat. No. 4,961,790 Smith et al. disclosed water-soluble containers that released solid or powdered admixtures when the container was dissolved within a wet mixer. On the other hand, Valle et al. disclosed in U.S. Pat. No. 5,203,629 a non-water-soluble packaging that disintegrated under the grinding effect of the wet concrete mix, thereby releasing admixtures throughout the concrete. In U.S. Pat. No. 5,320,851 DeMars et al. disclosed a disintegratable gelatin or wax capsule for introducing fluid or semi-fluid admixtures into the concrete mix.

Attempts have also been made to dispense certain admixtures in powdered or compacted dry form. U.S. Pat. No. 4,284,433 of Aignesberger et al. disclosed solid pelletized additives composed of a naphthalenesulphonic acid derivative-formaldehyde condensate, a resin based on an amino-s-triazine with at least two $NH_2$ groups and modified with sulphite or sulphonic acid, a sulphite- or sulfonic acid-modified melamine-formaldehyde poly-condensate, a copolymer based on styrene and acrylonitrile, a lignin sulfonate, or a phenol-sulphonic acid-formaldehyde poly-condensation product.

A similar concept was disclosed in U.S. Pat. No. 5,728,209 of Bury et al. wherein a certain amount of powder or flake cement admixture material was pressed into a compacted unit that was designed to dissolve or break apart in a cementitious mixture such as wet concrete. The compacted unit was intended to have strength sufficient to maintain structural integrity during handling and storage, while having solubility or friability upon agitation in a wet concrete mix.

In U.S. Pat. No. 5,236,501, Nomachi et al. disclosed a method for coating cement particles involving aerial rotation of dry powdered cementitious particles and spraying the swirled particles with water, which optionally contained an admixture such as a water reducing agent.

Another coating method was disclosed in U.S. Pat. No. 5,766,323 of Butler et al. Hydrophobing additives were coated onto carrier particles, such as starch, methyl cellulose, carboxymethyl cellulose, cement, sand, silica, fly ash, alumino silicates, clay materials, lime, calcium carbonates, polystyrene beads, and polyacrylate beads. For example, Butler et al. described spraying an organopolysiloxane material and a binder material (e.g., polyvinyl alcohol) onto the outer surface of carrier particles using a fluidized bed to solidify the organopolyxiloxane and binder, through cooling or evaporation of solvent, onto the carrier particle surface.

The present inventors, however, believe that methods involving dry-compacting of admixtures and coating of carrier particles with admixtures are complicated and laborious. Typically, admixtures for concrete and mortar are supplied in liquid form, because they are manufactured as liquids. Considerable costs and time would be spent to dry them, to compact them, to pelletize or granulate them by fluidized bed coating evaporative methods. Even simpler forms of coating, such as using carrier particle materials such as vermiculite and zeolites, which have high surface areas, would be expensive and may introduce unwanted materials into a concrete, mortar, or grout composition.

In view of the disadvantages of the prior art, what are needed are a novel process for manufacturing a solid admixture system, a novel admixture, and a novel method for modifying hydratable cementitious compositions such as concrete, mortar, masonry, grout, and other matrix compositions.

SUMMARY OF THE INVENTION

In contrast to prior art methods, particularly those methods in which admixture(s) are coated onto carrier particles, the present inventors have devised a novel process whereby at least one admixture is introduced into matrix and coating compositions such as castable cementitious compositions (e.g., concrete, mortar, fireproofing, shotcrete) and coatings (e.g., paints, primers) and other compositions (e.g., adhesives, mastics).

More significantly, the present invention pertains to high-surface area containing particulates which are formed from at least one substantially hydrated cementitious binder and comminuted to an average particle diameter of 5 to 250 micrometers (and up to 6 centimeters or more). Admixtures can be intermixed with the cementitious binder before it is hardened and comminuted into the particulates. Alternatively, or in addition to having admixture(s) and/or additives intermixed into the particulates, the admixtures and/or additives may be coated onto the surface of the comminuted particulates at relatively high addition rates. Thus, an exemplary process of the invention comprises:

intermixing a hydratable cementitious binder and water to obtain a hydratable cementitious slurry; allowing said slurry to harden into a substantially hydrated mass; and comminuting the hardened mass into a plurality of particulates having an average particle diameter of 5 to 250 micrometers. The particulates can be as high as 6 centimeters for purposes of delivering cement additives in clinker intergrinding processes. Exemplary hydratable cementitious binders include Portland cement, gypsum, plaster, optionally with one or more pozzolans. The binder is mixed with water to form a paste (or slurry) that is then allowed to hydrate substantially into a solidified mass which is comminuted into particulates.

In a preferred method of the invention, at least one admixture is intermixed with the binder before it is hardened into a mass and comminuted into particulates. Mix water may be added directly to the one or more admixture(s), binder, or both at once, or incorporated in a aqueous dispersion, emulsion, or solution containing the admixture or admixtures. For example, a corrosion inhibitor admixture, such as a calcium nitrite dispersion, can be mixed with Portland cement and allowed to harden into a mass and then crushed to form the particulates.

Alternatively, or in addition to the admixture-intermixing method, the particulates can be coated with one or more admixtures. The particulates provide a high loading surface. In further embodiments of the invention, the particulates may contain one or more intermixed admixtures (e.g., calcium nitrite) and be coated with one or more other admixtures (e..g., polyoxyalkylene water reducers (or so-called superplasticizers), polyoxyalkylene shrinkage reduction admixtures, or other admixtures). This provides a means for simultaneous use of admixtures or agents that are not easily compatible (if otherwise used in the same solution).

When viewed under microscope, the surfaces of comminuted substantially hydrated cementitious particulates of the present invention are highly granular, and even microscopically granulose in nature. The particulates are not only "granular" but are microscopically "granulose" because they have small granulate surface textures or granules upon the individual granule particulates.

Thus, the particulates of the invention provide an excellent and novel carrier particle system for delivering chemical additives, such as admixtures, into castable matrix compositions (such as concrete, mortar, masonry), sprayable matrix compositions (such as shotcrete or sprayable fireproofing, such as gypsum-based fireproofing), coating compositions (such as latex and non-aqueous paints, primers), as well as adhesive compositions. When an admixture such as calcium nitrite is incorporated into a concrete using the inventive particulates, it was suprisingly found that the calcium nitrite retains its ability to provide corrosion inhibition even though it is introduced into the concrete while initially embedded in hydrated cement. As another example, the particulates of the invention may be used to incorporate an admixture such as calcium nitrite into a paint or coating composition, such as epoxy coating for steel rebar.

The inventors believe that significant advantages may be obtained by the process of the invention, not only in terms of avoiding time-consuming labor, energy costs, and processing complexity; but also convenience in loading a high level of admixture(s) per unit of carrier material and in obtaining uniform dosing practice. In intermixing and hydrating together the admixture(s) and hydratable cementitious binder, high admixture-to-cement ratios of at least 10%, and more preferably at least 12% to 90%, and more preferably 15–60%, by weight of admixture(s) on weight of cement, are believed to be realizable through the process of the invention.

The use of cement in making cementitious-admixtures particulates also permit lower water/cement ratios in the final concrete, mortar, masonry, fireproofing, or shotcrete composition in comparison to using conventional liquid admixtures. Moreover, the inventors believe that hydrated cement avoids incompatibility problems that sometimes arises between admixtures and cement, and would not be detrimental to the final composition.

The present invention also provides methods for modifying matrix compositions, such as castable cementitious compositions (e.g., ready-mix concrete, pre-cast concrete, mortar, grout, masonry concrete, shotcrete, gypsum, plaster), as well as latex and non-aqueous polymers (e.g., acrylic, alkyd, epoxy, polyester, urethane), by introducing the above-described particulates into the matrix or coating composition to be modified.

Further advantages and features of the invention are described hereinafter.

DETAILED DESCRIPTION OF PREFERRED EMBODIMENTS

Figure 1:
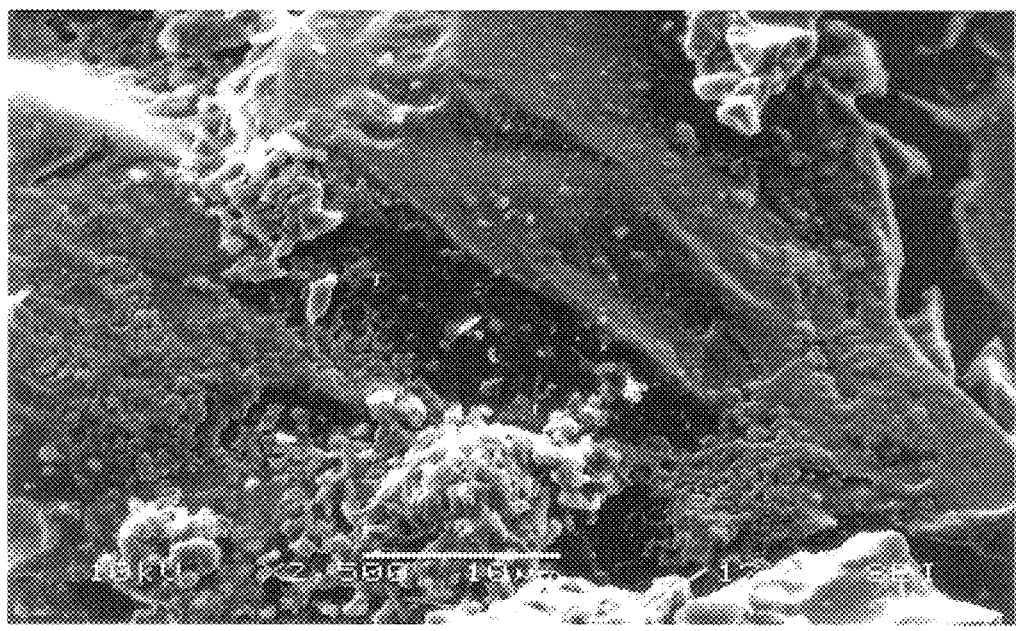
FIG. 1 is a microphotograph (2500×) of a cement particle spray-coated with an admixture using a simulated fluidized bed procedure (PRIOR ART)

The term "cement," as used herein, shall mean and include a Portland cement which, as used in the construction trade, means a hydratable cement produced by pulverizing clinker consisting of hydraulic calcium silicates, all usually containing one or more of the forms of calcium sulfate as an interground addition with ASTM types, I, II, III, IV or V.

"Cementitious" materials are materials that alone have hydraulic cementing properties in that they set and harden in the presence of water. Included in cementitious materials are ground granulated blast-furnace slag (although some air cooled slags may be deemed cementitious as well) and natural cement (e.g., ordinary Portland cement). "Cementitious" materials may also include gypsum (e.g., calcium sulfate hydrate), aluminous cement, ceramic cement, oil well drilling cement, and others.

In addition to Portland cement, cements useful for making intermixed-hydrated cementitious-admixture particulates of the invention may further include a pozzolan, which is a siliceous or aluminosiliceous material that possesses little or no cementitious value, but which, in finely divided form in the presence of water, will chemically react with the calcium hydroxide released by the hydration of Portland cement to form materials with cementitious properties. Diatomaceous earth, limestone, clays, shales, fly ash, silica fume, and blast furnace slag are some of the known pozzolans. Certain ground granulated blast-furnace slags and high calcium fly ashes possess both pozzolanic and cementitious properties.

Another exemplary "hydratable cementitious binder" of the invention may not even require Portland cement at all, such as the following: 5–20% by weight of silica fume; 10–60% by weight of fly ash; and 10–75% by weight of slag.

Particulates of the invention, such as substantially hydrated, comminuted Portland cement and/or gypsum particles, may be incorporated, as another example, into spray-applied fireproofing as a substitute for water-containing materials (See e.g., U.S. Pat. No. 5,556,576 of Berneburg et al. disclosing the use of bauxite in spray-applied fireproofing, incorporated herein by reference).

As summarized previously, exemplary processes of the invention involve mixing a hydratable cementitious binder with water, allowing the binder to substantially hydrate into a mass, and comminuting the hardened mass to provide a plurality of particulates. The average diameter size of the particulates can vary in range depending upon the ultimate use. For example, the inventors contemplate that for use in incorporating admixtures into matrix materials such as concrete, a preferred size range is about 5–250 micrometers. For incorporating admixtures such as calcium nitrite into a paint or coating composition (e.g., epoxy paint), a preferred size range is about 5 to 20 micrometers. For incorporate cement additives into ball mills during clinker intergrinding processes, a preferred size range is about 5 micrometers up to 6 centimeters or more. Such uses are also exemplary embodiments of the present invention.

As used herein, the term "slurry" may be synonymous or interchangeable with "paste" because the significance here is simply to indicate that the cementitious binder particles are substantially mixed with water in an amount sufficient to initiate hydration of the binder, such that the slurry (paste) will harden into a mass that can then be comminuted into smaller particles such as by mechanical crushing the hardened mass with a press or between rollers (e.g., steel).

The hydratable cementitious binder, in further embodiments, may be combined with one or more admixture(s) with separate mix water added. Alternatively, the admixture or admixtures may be added in the form of an aqueous dispersion or emulsion that already contains mix water. The admixture(s) can also be combined into an aqueous cementitious slurry, such as mortar (having fine aggregate such as sand) or a concrete (further having coarse aggregate such as crushed gravel or stones), although this is less desirable because this could increase the cost of shipment.

The term "admixture," as discussed in the above background, refers to materials other than cement, water, and aggregate used as an ingredient of mortar or concrete, and added to the batch immediately before or during its mixing. Some admixtures are used to modify the fluid properties of fresh concrete, mortar and grout, while others are used to modify hardened concrete, mortar, and grout. The various admixtures used in the present invention are materials that can be used in concrete mortar or grout for the following purposes: (1) workability without increasing water content or to decrease the water contents at the same workability: (2) to retard or accelerate the time of initial setting; (3) to reduce or prevent settlement of the finished material or to create slight expansion thereof; (4) to modify the rate and/or capacity for bleeding; (5) to reduce segregation of constituent ingredients; (6) to improve penetration and pumpability; (7) to reduce the rate of slump loss; (8) to reduce heat evolution during early hardening; (9) to accelerate the rate of strength development at early stages; (10) to increase the strength of the finished material (compressive, tensile or flexural); (11) to increase durability or resistance to severe conditions of atmospheric exposure; (12) to decrease the capillary flow of water within the material; (13) to decrease permeability of the material to liquids; (14) to control expansion caused by the reaction of alkalies with certain aggregate constituents; (15) to produce cellular concrete; (16) to increase the bond of concrete to steel reinforcing elements; (17) to increase bond between old and new concrete; (18) to improve the impact resistance and abrasion resistance of finished materials; (19) to inhibit the corrosion of embedded metal, such as to protect steel reinforcement in a concrete matrix; and (20) to produce colored concrete or mortar. Therefore, conventional admixtures may be employed for purposes of the present invention. A non-exhaustive illustrative list, organized according to functional admixture categories understood in the industry, is provided in the following paragraphs:

Set accelerators are used to accelerate the setting and early strength development of concrete. Some of the common materials that an be used to achieve this function are calcium chloride, triethanolamine, sodium thiocyanate, calcium formate, calcium nitrite, and calcium nitrate. (Some of these, e.g., calcium nitrite, also function as corrosion-inhibiting admixtures).

Retarders or delayed-setting admixtures are used to retard, delay, or slow the rate of setting of concrete. Retarders are used to offset the accelerating effect of hot weather on the setting of concrete, or to delay the initial set of concrete or grout when difficult conditions of placement occur when problems of delivery to the job site occur, or to allow time for special finishing processes. Most retarders also act as water reducers and can also be used to entrain some air into concrete. Lignosulfonates, hydroxylated carboxylic acids, lignin, borax, gluconic, tartaric and other organic acids and their corresponding salts, and certain carbohydrates can be used as retarding admixtures.

Air detrainers are used to decrease the air content in the mixture of concrete. Tributyl phosphate, dibutyl phthalate, octyl alcohol, water-insoluble esters of carbonic and boric acid, and silicones are some of the common materials that can be used to achieve this effect.

Air-entraining admixtures are used purposely to entrain microscopic air bubbles into concrete. Air-entrainment dramatically improves the durability of concrete exposed to moisture during cycles of freezing and thawing. In addition, entrained air greatly improves a concrete's resistance to surface scaling caused by chemical deicers. Air entrainment also increases the workability of fresh concrete while eliminating or reducing segregation and bleeding. Materials used to achieve these desired effects can be selected from salts of wood resin (Vinsol resin), synthetic detergents, salts of sulfonated lignin, salts of petroleum acids, salts of proteinaceous material, fatty and resinous acids and their salts, alkylbenzene sulfonates, and salts of sulfonated hydrocarbons.

Alkali-reactivity reducers can reduce alkali-aggregate expansion, and these may include salts of lithium and barium. Some pozzolans such as fly ash, silica fume, and blast-furnace slag may also work as alkali-reactivity reducers.

Bonding admixtures are usually added to portland cement mixtures to increase the bond strength between old and new concrete. These include organic materials such as rubber, polyvinyl chloride, polyvinyl acetate, acrylics, styrene butadiene copolymers, and other powdered polymers.

Water-reducing admixtures are used to reduce the amount of mixing water required to produce concrete of a certain slump, to reduce the ratio of water and cement, or to increase slump. Typically, water reducers will reduce the water content of the concrete mixture by approximately 5% to 10%.

Superplasticizers are high-range water reducers or water-reducing admixtures. They are added to concrete to make high-slump flowing concrete, thus reducing the water-cement ratio. These admixtures produce large water reduction or great flowability without causing undue set retardation or entrainment of air in mortar of concrete. Among the materials that can be used as superplasticizers are sulfonated melamine formaldehyde condensates, sulfonated naphthalene formaldehyde condensates, certain organic acids, lignosulfonates, and/or blends thereof. Particularly preferred superplasticizers are those comprising polyether groups, such as disclosed in U.S. Pat. Nos. 4,814,014 and 4,960,465 of Arfaei, and more preferably those comprising polyoxyalkylene groups, such as disclosed in U.S. Pat. No. 5,703,174 of Darwin et al.; all references being incorporated herein by reference. Suitable polyoxyalkylene-containing superplasticizers deemed suitable for use in the present invention are available from Grace Construction Products, Cambridge, Mass., under the tradename ADVA®.

Natural and synthetic admixtures are used to color concrete for aesthetic and safety reasons. These coloring admixtures are usually composed of pigments and include carbon black, iron oxide, phthalocyanine, umber, chromium oxide, titanium oxide, and cobalt blue.

Corrosion inhibiting admixtures in concrete are used for protecting embedded reinforcing steel from corrosion. The high alkaline nature of the concrete causes a passive protective oxide film to form on the steel. However, carbonation or the presence of chloride ions from deicers or seawater can sometimes render the film nonprotective. Corrosion-inhibiting admixtures chemically arrest this corrosion reaction. The materials most commonly used to inhibit corrosion are calcium nitrite and/or nitrate, sodium nitrite and/or nitrate, sodium benzoate, certain phosphates, fluoroaluminates, and fluorosilicates. Other materials may include amines, esters, molybdates, phosphates, fatty acid esters, or mixtures thereof.

Corrosion inhibitors are commercially available as calcium nitrite solutions, available from Grace Construction Products under the tradename DCI®.

Dampproofing admixtures reduce the permeability of concrete that have low cement contents, high water-cement ratios, or a deficiency of fines in the aggregate. These admixtures retard moisture penetration into dry concrete, and include certain soaps, stearates, and petroleum products.

Grouting agents, such as air-entraining admixtures, accelerators, retarders, and non-shrink and workability agents, adjust group properties to achieve a desired result for specific applications. For example, portland cement groups are used for a variety of different purposes, each of which may require a different agent to stabilize foundations, set machine bases, fill cracks and joints in concrete work, cement oil wells, fill cores of masonry walls, or grout aggregate concrete.

Gas formers, or gas-forming agents, are sometimes added to concrete and grout in very small quantities to cause a slight expansion prior to hardening. The amount of expansion is dependent upon the amount of gas-forming material used, and the temperature of the fresh mixture. Aluminum powder, resin soap, and vegetable or animal glue, saponin or hydrolyzed protein can be used as gas formers.

Permeability reducers are used to reduce the rate at which water under pressure is transmitted through concrete. Silica fume, fly ash, ground slag, natural pozzolans, water reducers, and latex can be employed to decrease the permeability of the concrete. Pozzolan is a siliceous or siliceous and aluminous material, which in itself possesses little or no cementitious value. However, in finely divided form and in the presence of moisture, pozzolans will chemically react with calcium hydroxide at ordinary temperatures to form compounds possessing cementitious properties.

Pumping aids are added to concrete mixed to improve pumpability. These admixtures thicken the fluid concrete, i.e., increase its viscosity, to reduce de-watering of the paste while it is under pressure from the pump. Among the materials used as pumping aids in concrete are organic and synthetic polymers, hydroxyethylcellulose (HEC) or HEC blended with dispersants, organic flocculents, organic emulsions of paraffin, coal tar, asphalt, acrylics, bentonite and pyrogenic silicas, natural pozzolans, fly ash and hydrated lime.

Bacteria and fungal growth on or in hardened concrete may be partially controlled through the use of fungicidal, germicidal, and insecticidal admixtures (altogether referred to hereinafter as "biocide agents"). The most effective materials for these purposes are polyhalogenated phenols, dieldrin emulsions, and copper compounds.

Shrinkage reduction admixtures (SRAs) are known for minimizing cracking phenomenon caused by drying shrinkage in concrete. Various oxyalkylene adducts are suitable for this purpose (See e.g., U.S. Pat. Nos. 3,663,251 and 4,547,223). Terminally alkyletherified or alkyles or alkylesterified oxyalkylene polymers were thought to be useful for this purpose (see e.g., U.S. Pat. No. 5,147,820). Japanese Patent Application 58-60293 taught that shrinkage reduction of cement can be accomplished by the addition of compounds which are aliphatic, alicyclic or aromatic group terminated oxyethylene and/or oxypropylene repeating chain units. An exemplary SRA, as taught in U.S. Pat. No. 5,938,835 of Shawl et al., comprised a mixture of certain alkyl ether oxyalkylene adducts with certain oxyalkylene glycols to provide cement compositions of mortar or concrete which inhibit drying shrinkage while permitting substantial air entrainment and enhanced compressive strength. A preferred SRA, disclosed in U.S. Pat. No. 5,556,460 of Shawl et al., was composed of a low molecular weight oxyalkylene polyol or ether adduct of polyols with at least one high molecular weight comb polymer having a plurality of polyoxyalkylene chains and carboxylic acid groups. All of the foregoing patents are incorporated herein by reference.

The term "admixture" also encompasses "masonry admixtures" in addition to concrete admixtures for which many materials are already identified above. However, some additional masonry admixtures are worth noting here. Integral water repellents are used in masonry to reduce water passage through manufactured units (e.g., blocks, pavers, other units) produced from concrete having a low moisture content. More specifically, an integral water repellent is used for minimizing the transmission of water, by capillary action, from the outside face of the manufactured unit to the interior of the unit. A typical application is the use of integral water repellents within a concrete masonry unit used for building external walls. Some common raw materials for integral water repellents include calcium stearate, zinc stearate, and butyl oleate. Such fatty acids may be preferably coated onto the particulates of the invention and thus incorporated into masonry cement or concrete or into mortar. An efflorescence control agent is another masonry (low moisture concrete) admixture used for reducing the occurrence of efflorescence on the surfaces of manufactured units (e.g., blocks). Efflorescence is a whitish deposit or encrustation of soluble and non-soluble salts that forms when moisture moves through and evaporates on the masonry units. Common raw materials include calcium stearate, zinc stearate, butyl oleate, and tall oil fatty acids. Again, such fatty acids may be coated onto the particulates of the invention.

Accordingly, exemplary processes and particulates of the invention may involve the use of one or more known admixtures, such as a water reducer, superplasticizer, set retarder, set accelerator, air entraining admixture, air detraining admixture, shrinkage reducing admixture, corrosion inhibiting admixture, alkali reactivity reducer, permeability reducing admixture, bonding agent, pumping aid, gas former, colorant, grouting agent, dampproofing agent, biocide agent, masonry admixture, efflorescence control admixtures, or mixtures thereof. For example, a Portland cement and/or blast furnace slag, optionally with one or more pozzolans, may be intermixed with a calcium nitrite dispersion (having mix water) to provide a slurry, which is then allowed to harden into a mass that is then comminuted (such as by using a press or steel rollers) into exemplary intermixed-hydrated cementitious-admixture particulates of the invention.

The present invention therefore provides an accurate way to measure the amount of admixture (or additive) that is being delivered into a concrete, mortar, grout, or other matrix composition being treated, particularly in instances in which the admixture(s) is/are dosed in small quantities. One may obtain an accurate measurement of the amount of admixture(s) being dosed, because one can more easily measure the bulk amounts of admixture(s) combined with cementitious binder, regardless of whether the admixture is intermixed with the binder before it is hardened, is coated onto the particulates after the binder is hardened and comminuted into the particulates, or both. The amount of admixture being introduced into the matrix composition to be treateed (e.g., concrete) or coating composition (e.g., paint) can be done simply by measuring the bulk weight of particulates and the relative amount of admixture or admixtures, which can constitute anywhere from 10–90% or more based on the dry weight of the binder.

Thus, the present invention also permits one to combine admixture materials that present compatibility problems. In further exemplary processes of the invention, intermixed-hydrated cementitious-admixture particulates can be made with a corrosion inhibitor such as calcium nitrite (intermixed in solution form with a binder such as Portland cement), and after comminution of the hydrated mass into particulates, the particulates may be further processed such as by coating the particulates (which have a highly "micro-granulose" surface as described above) with a superplasticizer (e.g., a polyoxyalkylene type) and/or with a shrinkage reducing admixture (e.g., oxyalkylene type), as described above. In this way, one may accurately measure and control the simultaneous dosing of two or more admixtures in combination for a given batch of concrete, mortar, grout, paint, coating, or adhesive.

In another exemplary embodiment of the invention, the inventors envision that polyoxyalkylene-containing comb polymer type superplasticizers, and/or shrinkage reducing admixtures of the oxyalkylene type, as mentioned above, can be coated onto comminuted hydrated cement particles made with or without other admixtures embedded in the particles.

The ratio of admixture or admixtures to be combined with the hydratable cementitious binder to provide intermixed-hydrated cementitious-admixture particulates of the invention can be 5–95%:95–5%, more preferably at least 10–90%:90–10%, and most preferably at least 15–85%:85–15% by weight admixture(s)/cementitious binder. Typically, when admixtures are conventionally added into the concrete or mortar to be treated, the amount is usually about 0.01–5% based on the weight of cementitious binder, so these loading percentage ranges begin with a high admixture/cement ratio and preferably increase.

The main consideration in the intermixing process is to contain the largest possible amount of admixture (or admixtures if in combination) and to obtain a paste or slurry of adequate consistency that sets and hardens in a reasonable time. If a liquid admixture (which is to be intermixed with the cement) does not contain water, then water should be added in an amount sufficient to initiate hydration so that setting and hardening can be achieved within 1–2 days.

Intermixed-hydrated cementitious-admixture particulates of the invention are preferably partially to substantially hydrated. The quantity of water contained in the particulates may be measured by way of the loss on ignition (LOI) test in accordance with JIS R 5202 (Method for Chemical Analysis of Portland Cement). Samples may be collected every 5 minutes (starting at 5 minutes and proceeding through 160 minutes). Loss on ignition is the weight loss of a substance subjected to repetitions of ignition in air for 15 minutes at 950 degrees Celcius, and this weight loss indicates the amount of reduction in moisture, organics, and carbon dioxide during the process. Preferably, exemplary particulates of the invention have an LOI of about 5–45%. More preferably, ignition loss should be 8–40%. These ranges are substantially higher than the level of hydration taught, for example, in prior art coating methods (See U.S. Pat. No. 5,236,501 of Nomachi et al., see Example 1).

Comminution of the substantially hydrated hardened cementitious mass (whether cement binder alone or hydrated in combination with pozzolanic material and/or one or more admixtures) can be achieved by subjecting the mass to compressive or grinding forces, such as by using a jaw crusher, a roller crusher (e.g., opposed steel rollers), a ball mill, a disc mill, or a grinder. Average particulate sizes are preferably finer than #50 mesh, although broad average particle ranges (e.g., 1–250 micrometers up to 6 centimeters or more) are contemplated as suitable for the various applications of the present invention. The size of the particles will depend on the application. The particles may be coarser where they are going to be incorporated into hydratable cementitious compositions (concrete, mortar), and may be finer if they will be incorporated into other matrix compositions, such as epoxy adhesives or coatings, urethane adhesives or coatings, latexes (e.g., paint), or other compositions.

The particulates may be used to deliver additives into Portland cement, such as for the purpose of introducing grinding or processing aids into a ball mill during the grinding of clinker or blast furnace slag (preferably granualr) to produce a hydratable cementitious binder. For example, hydrated cement particulates (having one or more admixtures encapsulated within and/or coated on the particle surface) may be employed on the order of 1 micrometer to 6 centimeters in size. These particles can be interground with clinker during the manufacturing of cement in a ball mill, roller miller, or roll press mill operation. Exemplary additives for grinding blast furnace slag may include certain amine salts of aryl hydroxy compounds (e.g., triethanolammonium phenoxide) as disclosed in Canadian Patent 1,163, 394 and U.S. Pat. No. 4,286,962. Other additives are polyacrylic acid and its alkali metal salt as disclosed in U.S. Pat. Nos. 5,720,796 and 5,977,224 of Cheung and Gaidis. Exemplary additives for grinding cement or cement clinker may include amine salts of aromatic group-containing carboxylic acids (e.g., triethanolamine benzoate) as disclosed in Canadian patent 1,224,495. Another cement additive involves diesters formed by reacting a polyol such as alkylene glycol with a monobasic carboxylic acid such as acetic acid, as disclosed in U.S. Pat. No. 4,643,362. Other exemplary cement additives include binding-densifying agents for mills employing rollers, such as the polyacrylic acid, polyvinyl alcohol, polyvinyl acetate, polyvinyl chloride, polyoxyethylene, polysulfonic acid, or salts thereof, as disclosed in U.S. Pat. No. 6,213,415 of Cheung. Yet another exemplary cement additive comprises alkanolamines, as disclosed in U.S. Pat. No. 4,943,323 of Gaidis et al, and diethanolamine isopropanolamine as disclosed in U.S. Pat. No, 6,048,393 of Cheung and Myers. Another exemplary cement additive involves the use of alcohols, ketones, amides, and/or aldehyes for imparting water repellency, and/or set retardation to Portland masonry cements, as disclosed in U.S. Pat. No. 4,375,987.

Figure 2:
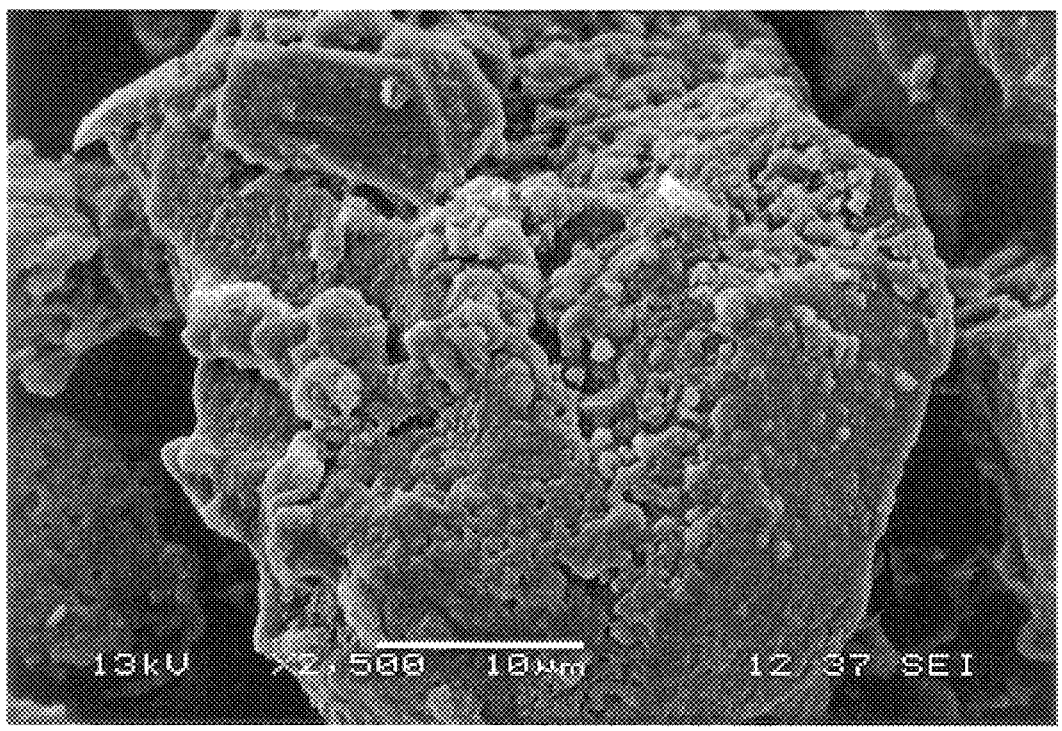
FIG. 2 is a microphotograph (5000×) of a cement particle spray-coated with an admixture using a simulated fluidized bed procedure (PRIOR ART)

FIGS. 1 and 2 are photographs taken through microscope, at 2500× and 5000× magnification respectively, of (unhydrated) cement particles whose surfaces were sprayed using a conventional admixture (a calcium nitrite dispersion) in a manner resembling fluid bed coating methods of the prior art. The fluid bed coating method was approximated by using less than one gram of Portland Cement spread onto porous paper. Using a spray gun able to disperse an extremely fine mist, the particles were coated using a 30% solution of calcium nitrite, and then dried in an oven at 110° C. This process was repeated several times, with the drying step rapidly following upon the spraying step, to increase the loading of calcium nitrite while minimize hydration of the particles. Such loaded unhydrated cement particles are thus shown in FIGS. 1 and 2 as explained above.

Figure 3:
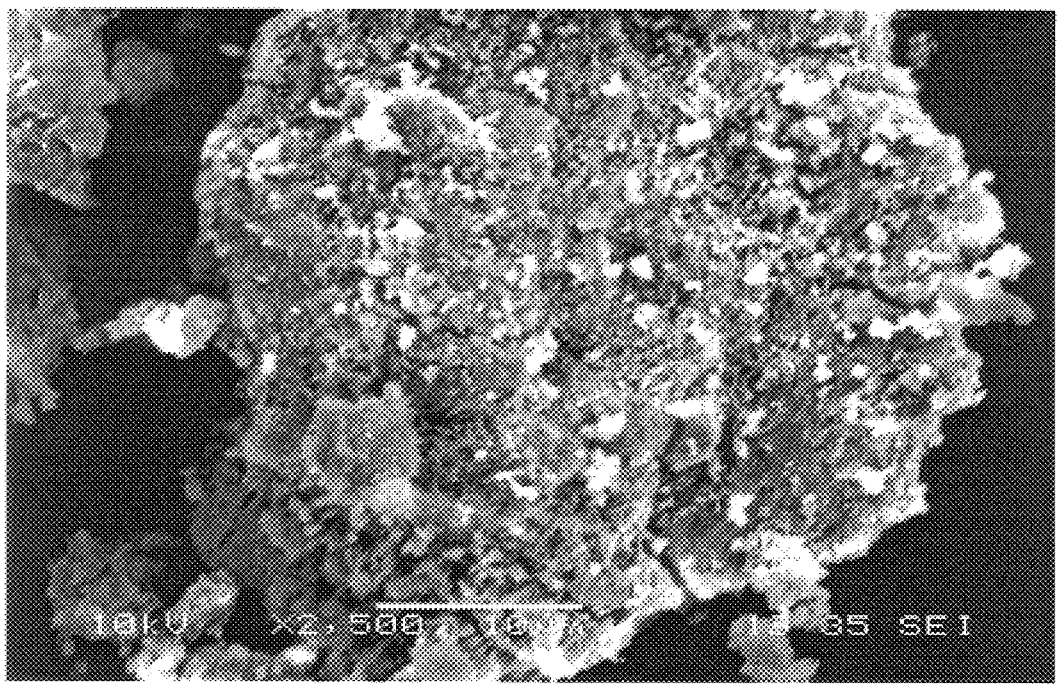
FIG. 3 is a microphotograph (2500×) intermixed-hydrated cementitious-admixture particulates of the present invention having a micro-granulose surface texture.
Figure 4:
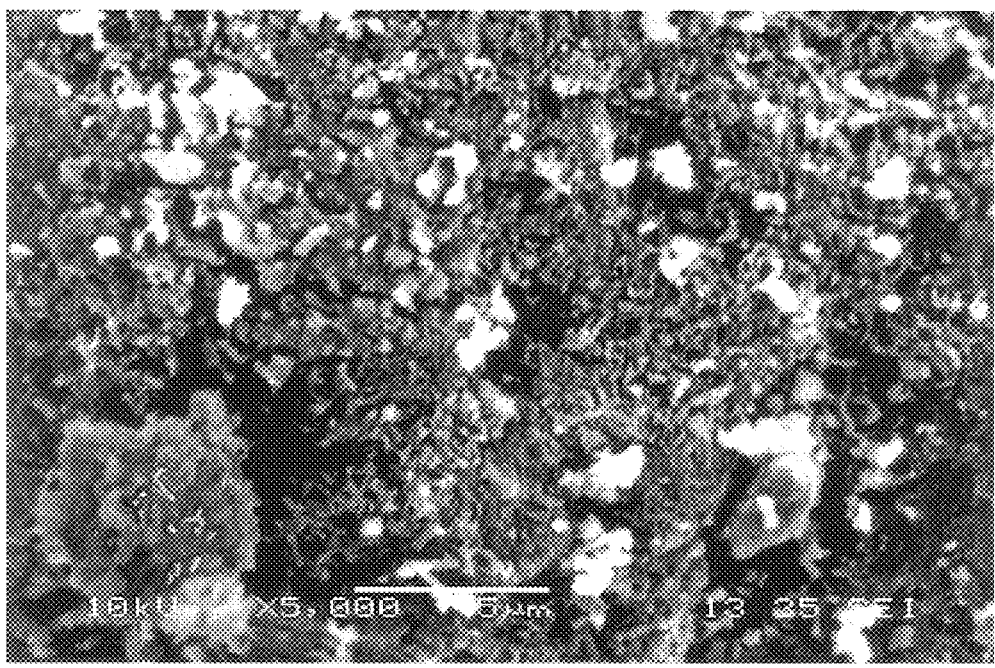
FIG. 4 is a microphotograph (5000×) intermixed-hydrated cementitious-admixture particulates of the present invention having a micro-granulose surface texture.

In contrast, FIGS. 3 and 4 are photographs taken through microscope, at 2500× and 5000× magnification respectively, of exemplary intermixed-hydrated cementitious-admixture particulates (embodying calcium nitrite as admixture) made by the above-discussed process of the present invention wherein the admixture is intermixed with the cementitious binder before hardening and comminution. A calcium nitrite dispersion ("DCI" brand corrosion inhibitor from Grace Construction Products, Cambridge, Mass.) was intermixed with Portland cement, to form a paste, which was hardened and then particulated using the crushing force of a press. As shown in FIGS. 3 and 4, the granular particulates have a highly micro-granulose surface texture, which suggests a much greater surface area and structural porosity in contrast to the smoother surfaces seen in FIGS. 1 and 2. In further exemplary embodiments of the invention, the cementitious-admixture particulates may be coated with admixture(s) similar to or different from the ones intermixed with the binder before hydration.

The distribution or dispersability of the particulates can be improved by including a dispersant along with the admixture either intermixed or coated onto the surface of the particulate. The dispersant may be selected from the water reducer or superplasticizer admixtures described above, and for dispersal purposes would preferably include lignosulfonates (e.g., sodium lignosulfonate), naphthalene sulfonate, melamine sulfonate, or any of the superplasticizers. The ratio of dispersant to other admixture (where the intermixed admixture is not a water reducer or superplasticizer) is about 1:1 to about 1:15, and more preferably 1:6 to about 1:9, based on dry weight components; and the level of dispersant will often depend on the nature of the dispersant itself. Again, the highly micro-granulose surface texture of the particulates will provide a much larger surface area for coating than unhydrated cement particles which have been used in prior art coating methods.

The inventors also contemplate that the EO/PO comb type superplasticizers and/or oxyalkylene shrinkage reducing admixtures mentioned above could also be spray-applied using a solvent onto comminuted hydrated cementitious particles, such as the cementitious-admixture particles mentioned above, or on hydrated cementitious particles that have not been blended with an admixture prior to hydration and comminution.

A plurality of granular particulates of the invention may be easily dispersed into matrix compositions, such as concrete, shotcrete, mortar, grouts, and other cementitious compositions, either as a bulk powder dispensed into bins, or by using known packaging/dispensing methods, such as by introducing the particulates in water-soluble containers (See e.g., U.S. Pat. No. 4,961,790) or non-water-soluble packaging of U.S. Pat. No. 5,203,629; both patents of which are incorporated by reference herein.

Exemplary intermixed-hydrated cementitious-admixture particulates of the invention may also be incorporated into other matrix compositions, such as latexes, coatings, paints, adhesive, and other hardenable matrix systems. For example, cementitious-admixture particulates containing a corrosion inhibitor, such as calcium nitrite, can be incorporated into epoxy coatings of the kind that are applied onto rebar (steel reinforcing bars) in reinforced concrete. This would help to achieve a high loading of a corrosion inhibitor and/or other additive(s). Another application would be to incorporate calcium nitrite-containing particulates of the invention into coatings used for metal surfaces (e.g., water tanks, metal roofs, steel or aluminum siding, metal beams, pipes, cables, and other metal surfaces)

Accordingly, another exemplary embodiment would be to incorporate the particulates of the invention into an epoxy coating. For example, calcium nitrite could be incorporated into cement in the amount of 10–30% based on weight of cement, and this is then hydrated by addition of water, allowed to harden, and then comminuted into fine particulates. The comminuted hydrated particulates could then be incorporated into an epoxy coating in the amount of 10–85% by weight based on the weight of the epoxy coating, and more preferably 20–50%. A possible range for the calcium nitrite in the epoxy coating might therefore be 1–25% based on weight.

The invention also provides methods for modifying matrix compositions involving incorporation of the particulates, as well as matrix compositions containing the particulates.

Further exemplary embodiments of the invention pertain to particulates comprising: a plurality of hydrated cementitious particulates comprising at least one admixture, said particulates operative to be admixed into a castable cementitious composition wherein said at least one admixture is operative to modify said castable cementitious composition.. For example, the at least one admixture has been blended into said particulates and embedded within a hydrated cement matrix of said particulates, as described previously herein. As another example, an admixture or admixtures may be coated on the surface of the particulates, along with admixtures that are embedded within the hydrated matrix of the particulates, or as the sole loading on the particulates. Preferably the particulates will have granules seen through the aid of a microscope on the surface of the particulates.

The following examples serve to illustrate various embodiments of the invention.

EXAMPLE 1

A shrinkage reducing admixture ("SRA") (e.g., available from Grace Construction Products under the name "ECLIPSE®") was added to cement with additional water to produce a hardened cement paste mix with 13% by mass of total powder (20% solids on solids or "s/s" on cement). This is considerably higher than maximum field dosages of about 2% s/s cement. The product was ground to a fine powder after hardening and added to a mixture of cement, fine aggregate, and water.

Figure 5:
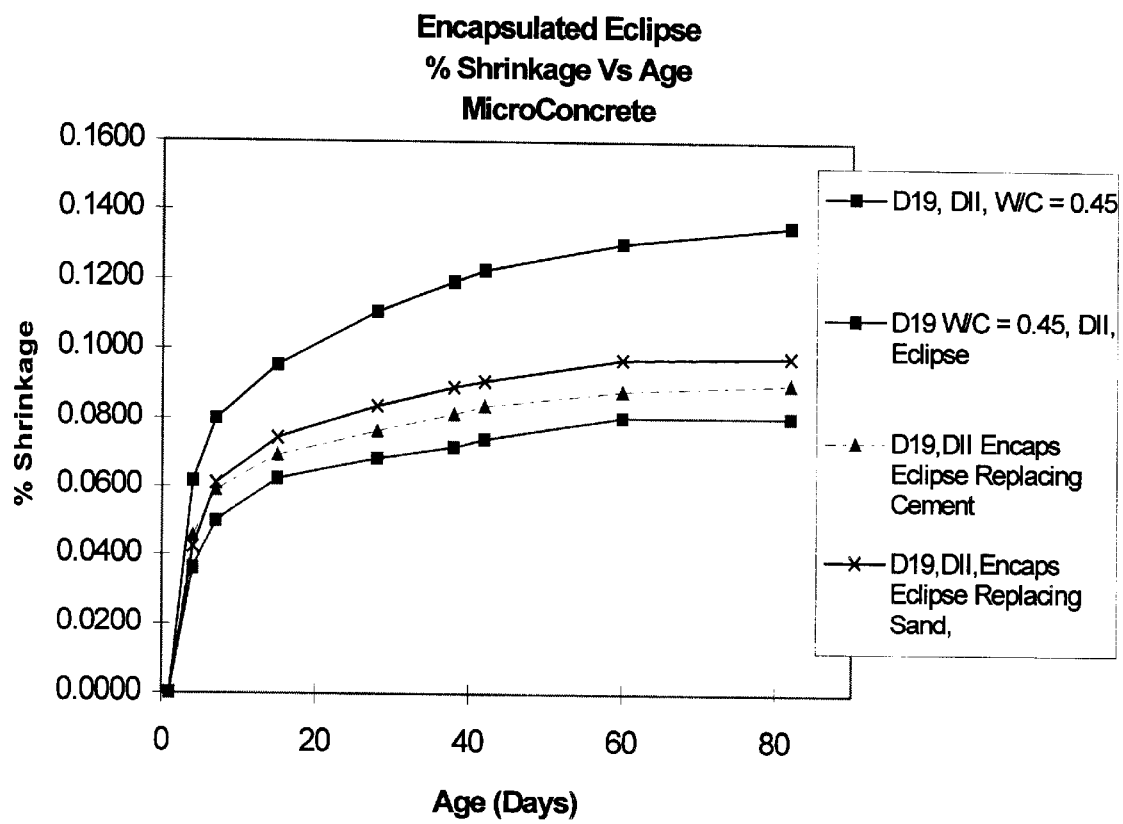
FIG. 5 is a graphic illustration of shrinkage performance of cement mix samples in which a liquid Shrinkage Reducing Admixture (SRA) was added and in which intermixed-hydrated cementitious-admixture particulates (embodying same SRA) of the present invention were added.

FIG. 5 illustrates shows shrinkage performance of cement mix samples without SRA, with a liquid SRA, and with SRA-embodying particulates made by the present invention. The shrinkage reduction achieved with the powder was about 70% that which was achieved by using the liquid, and strengths of concrete samples were comparable.

EXAMPLE 2

Figure 6:
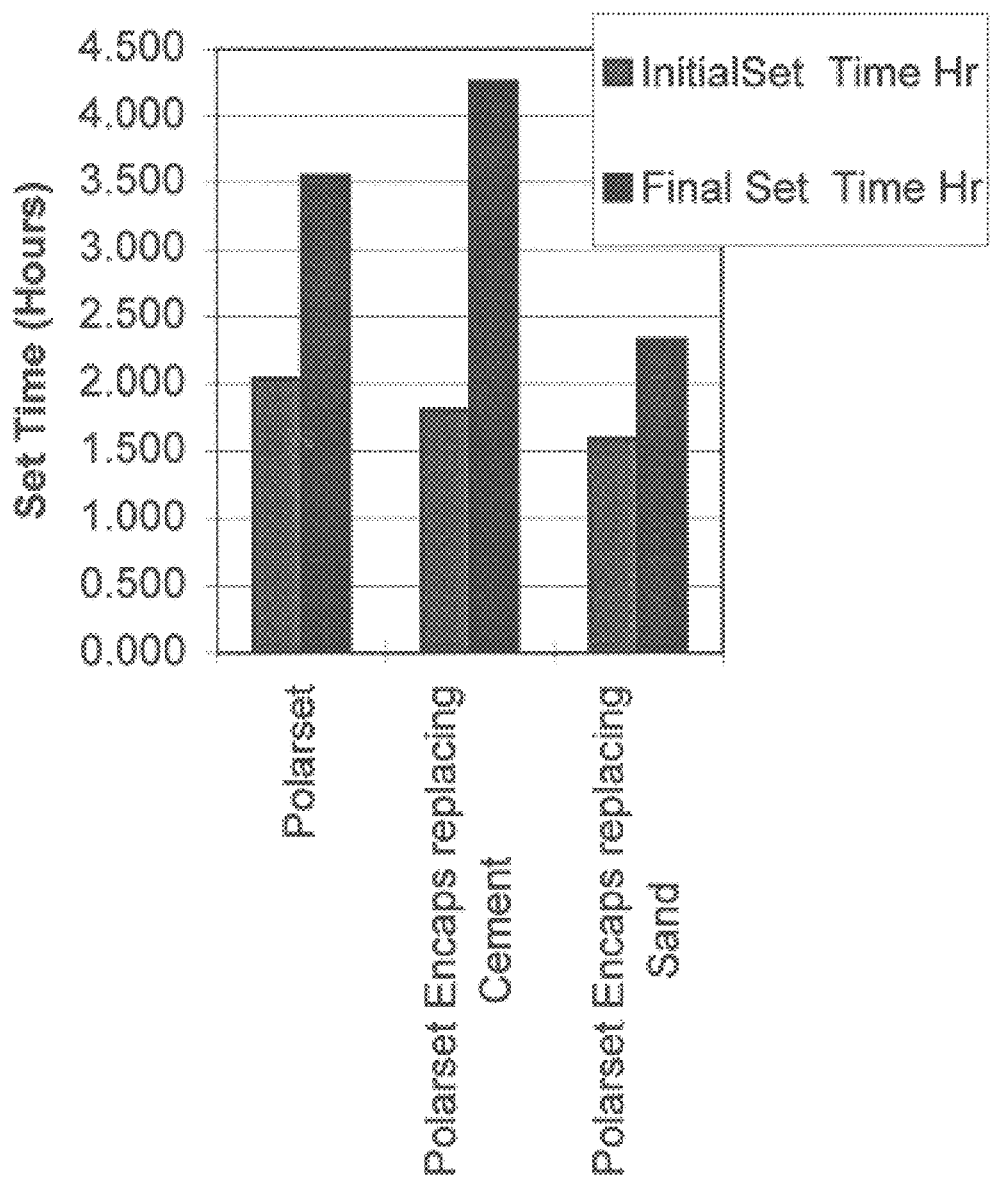
FIG. 6 is a graphic illustration of set time performance of cement mix samples in which a liquid set accelerator admixture was added and in which intermixed-hydrated cementitious-admixture particulates (embodying same set accelerator) of the present invention were added.
Figure 7:
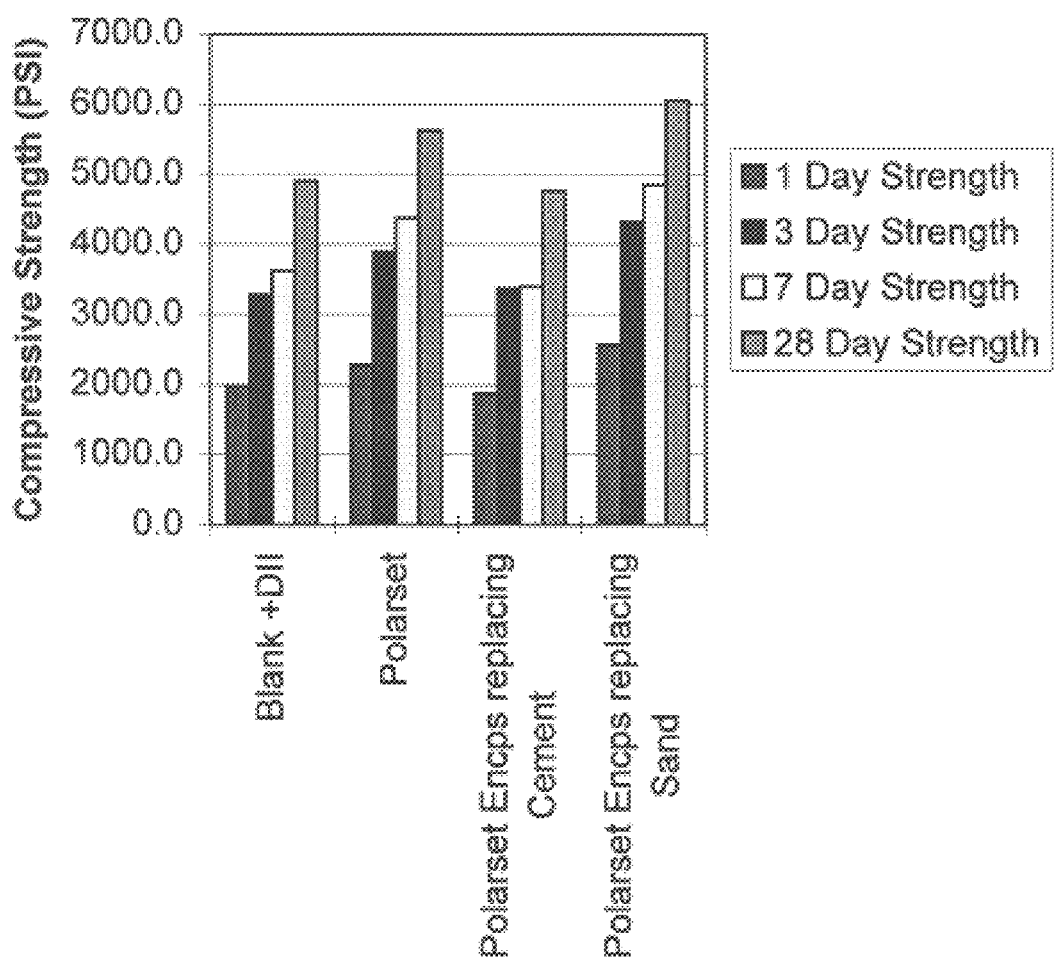
FIG. 7 is a graphic illustration of compressive strength of cement mix samples in which a liquid set accelerator admixture was added and in which intermixed-hydrated cementitious-admixture particulates (embodying same set accelerator) of the present invention were added.

A set accelerating admixture (e.g., POLARSET® brand available from Grace) was added to cement without additional water (1 part cement to 0.8 parts of admixture) as this admixture had 58% water which was sufficient for hydration. The final hardened paste had a solids content of 18.8% admixture based on dry wt. cement. This admixture in use is not customarily added above 2% s/s cement levels in field use. FIG. 6 illustrates that set acceleration performance is improved when accelerator is incorporated using the intermixed-hydration particulates of the invention. Compressive strength data, taken from the various mix samples and illustrated in FIG. 7, suggests that strength of mix sample using particulates of the invention were comparable to that obtained by using the accelerator in liquid form.

EXAMPLE 3

Figure 8:
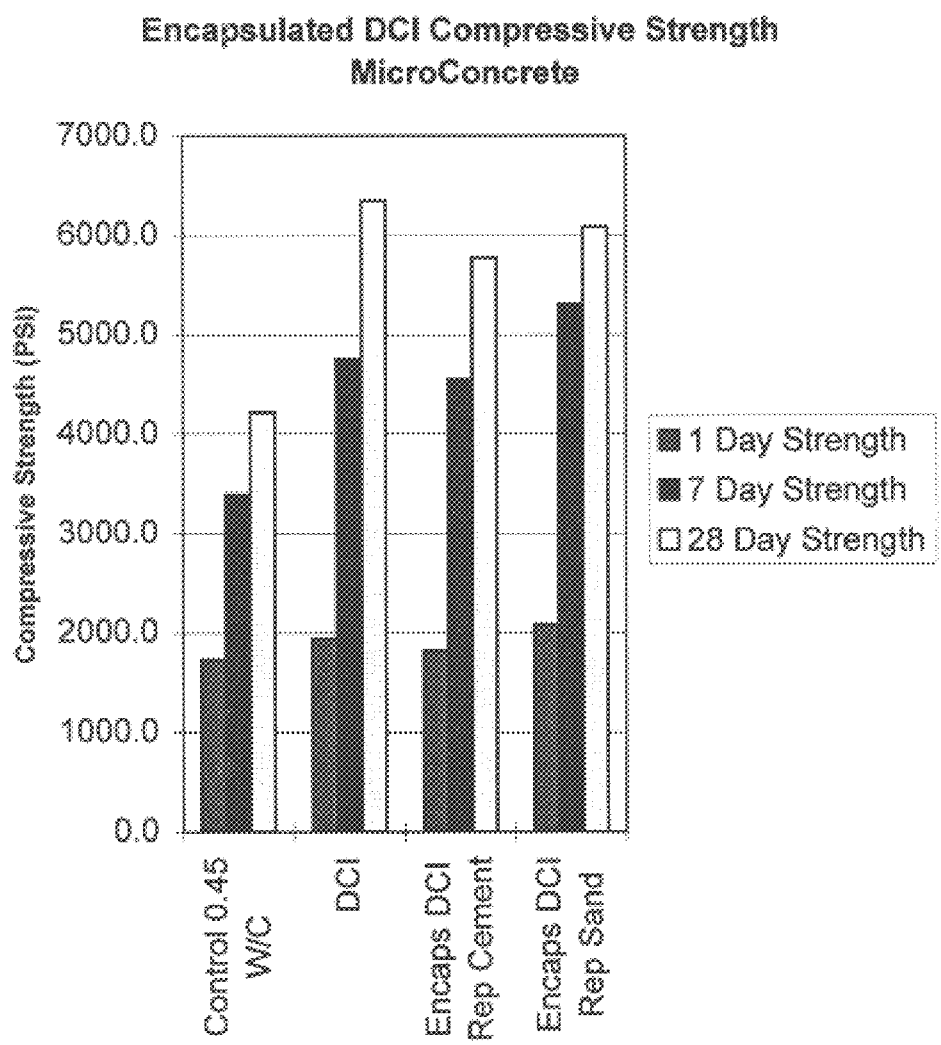
FIG. 8 is a graphic illustration of strength development of various mortar mix samples in which a liquid corrosion inhibitor admixture was added and in which intermixed-hydrated cementitious-admixture particulates (embodying same liquid corrosion inhibitor) of the present invention were added.

A corrosion inhibitor (DCI® brand from Grace) was added to cement without additional water (1 part cement to 1 part 33% solids solution). The final hardened paste had a solids content of 16.5% of solid admixture on cement. This admixture is conventionally added at an addition rate of under 2.5% solids of cement in field use. As shown in FIG. 8, strength development of sample cement mix treated with the particulates of the invention is comparable to mix sample that is conventionally treated with liquid admixture. Because corrosion performance in concrete is usually tested over extended time periods, the present inventors examined the nitrite content in the mixing water as an indicator of the corrosion inhibitor's performance over time. Five minutes after mixing the concrete samples, therefore, the nitrite content was examined. There was no difference between the liquid and cement paste addition methods, suggesting that the cement mix containing the inter-mixed calcium nitrite-containing particulates of the present invention and the cement mix containing liquid calcium nitrite would behave similarly over time in inhibiting corrosion.

EXAMPLE 4

The extent of hydration of admixture-containing particulates of the invention were tested using loss on ignition procedures, in accordance with JIS R 5202 (Method for Chemical Analysis of Portland Cement). Samples were collected starting at 5 minutes and measured every 5 minutes for 160 minutes. The data is presented in the table below:

| Specimen | Loss on Ignition |
| --- | --- |
| Type 1 Cement | 0.88% |
| Hydrated Cement To Be Used As A Carrier According to Invention | 20.29% |
| Hydrated Cement With Calcium Nitrite Admixed in According To Invention | 37.85% |

The above data establishes that particulates obtained by processes of the invention achieve high levels of hydration which exceed prior art coating methods. For example, these levels are higher than the 2.0–2.4% LOI disclosed in Example 1 of U.S. Pat. No. 5,236,501 which pertained to coating the surfaces of particles swirled in an air chamber.

EXAMPLE 5

Figure 9:
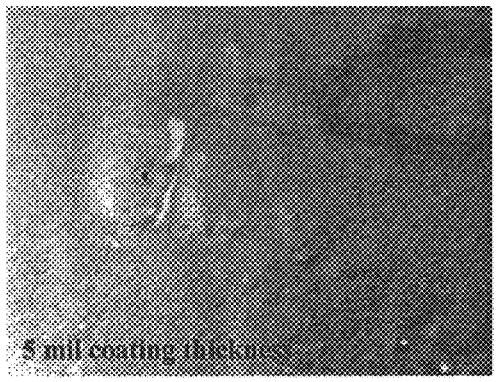
FIG. 9 contains two comparative illustrations of corrosion performance of structural steel, the one on the left depicting an epoxy coated steel (control) and the one on the right depicting epoxy coated steel wherein the coating contained particulates of the present invention made of cement and calcium nitrite (CaNi).
Figure 9:
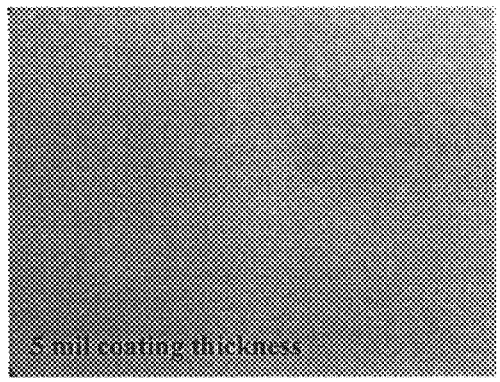

Liquid calcium nitrite was encapsulated into cement by combining equal masses of 33% calcium nitrite solution and cement. The resulting product was ground so that it could be incorporated into an epoxy coating 5 mils (125-micrometers) in thickness. The powder was used to replace 50% by mass of a commercial marine epoxy. A steel sheet (ASTM A36) was cut into sample pieces, each one being degreased. One sample piece was coated on a surface with marine epoxy (not having encapsulated calcium nitrite. A second sample piece was coated on a surface with epoxy having the encapsulated calcium nitrite according to the present invention. After the epoxy cured, both sheet samples were exposed to saturated calcium hydroxide solution (which simulates the pore water of concrete). This hydroxide solution had a pH of approximately 12.5 to 13 and contained approximately 3.5% sodium chloride. After 10 days of exposure, the surface portion of the steel sheet sample coated with epoxy not having the encapsulated calcium nitrite had visible corrosion and a large negative potential relative to a reference electrode (−0.6 V vs. saturated calomel), indicating that the specimen was severely corroding. Potential values more negative than −0.28 V (with respect to calomel) are considered to be corrosive. The steel sheet specimen coated with the epoxy having the encapsulated calcium nitrite had no visible corrosion, and its potential relative to the reference electrode (−0.052 V vs. saturated calomel) was in the region associated with passivity, thus indicating that corrosion was not initiated. A visual comparison is shown in FIG. 9.

EXAMPLE 6

The present inventors also believe that particulates containing a set accelerator may be incorporated into an adhesive or coating material to improve the adhesion of the adhesive or coating material to a cementitious surface that was damp or wet (e.g., freshly cast and/or covered with water) or which would become wet or damp. Thus, as a hypothetical example, particulates made in accordance with the present invention could incorporate a known set accelerator (e.g., a triethanolamine, sodium thiocyanate, calcium formate, calcium nitrite, calcium nitrate, calcium chloride, nitrite, chloride, formate, nitrate or mixture thereof), and such particulates could be incorporated into a latex paint, a waterproofing primer (e.g., acrylate, styrene butadiene, bitumen), and then applied to a wet cementitious surface, such as a concrete deck, a foundation, brick, mortar, masonry block, pavers, shotcrete, or the like. Moisture on and/or from the cementitious surface would initiate reactions with the partially hydrated cement of the particulates, creating new hydration products that would help bonding to the wet cementitious surface, and the inventors thus believe that incorporation of set accelerators would therefore increase speed of the bonding.

EXAMPLE 7

The inventors believe that coatings having particulates of the invention containing set retarders can be used to achieve special surface finishes on concrete. For example, a concrete (having coarse aggregates such as crushed stone and gravel) is cast into the shape of a wall, block, foundation, or concrete. A coating having set retarder-containing particulates of the invention is used to line the mold (or "form") before the casting and on exposed surfaces. Once the cast piece begins to harden, the coated surfaces may be brushed to expose the aggregate on the outer surface. The set retarder would facilitate this exposure of the aggregate by retarding the setting of the concrete. Thereafter, another coating may be applied to the exposed concrete surface, a coating that contains particles of the invention which incorporated, for example, a set accelerator, pigment, waterproofing agent, or mixture thereof. Thus, the particulates of the invention could provide much flexibility in coating systems that can be used in making and finishing hydratable cementitious articles.

EXAMPLE 8

The inventors believe that the present invention provides an ability to combine additives or admixtures that may be incompatible if otherwise employed within the same liquid solution. For example, calcium nitrite and dipropylene glycol t-butyl ether (DPTB) do not easily form a stable solution at combined concentrations above 10% in water. By combining these two in a cement slurry, which is allowed to harden into a mass that is then comminuted to provide particles of the invention, these two otherwise incompatible admixtures may now be incorporated together into hydratable cementitious compositions as in the same dose. (This particular combination would also provide an interesting feature in that DPTB would otherwise have set retarding characterstics at high dosages, but this could potentially be offset by the set accelerating properties of the calcium nitrite).

EXAMPLE 9

Multiple admixtures can be added to a concrete or mortar by intermixing one or more admixtures with cement to form particulates which are then coated with one or more other admixtures. This technique may be used to combine admixtures that are not very compatible with each other. For example, an incompatible admixture combination could include, on the one hand, calcium nitrite (CANI) which is available as an aqueous dispersion from Grace Construction Products under the "DCI" brand name, and, on the other hand, a superplasticizer, such available from Grace Construction Products under the ADVA® tradename. Another incompatible combination would be CANI and shrinkage reducing admixtures, such as those available from Grace Construction Products under the ECLIPSE® name. CANI is typically added into concrete as a dispersion, while superplasticizers and shrinkage reduction admixtures are typically added as liquids. However, the inventors mixed CANI with cement to form a slurry/paste, allowed this to harden into a mass, comminuted the mass to provide particulates; and then coated the superplasticizer component (by dissolving the polymer (which is otherwise used for making the liquid superplasticizer and which is designed in the chart as "PAJ") into a solvent that was sprayed onto the outter surface of the CANI-containing particulates. These particulates were introduced into concrete samples (partially replacing a fraction of the sand used), and the samples were tested for compressive strength. The inventors discovered that such samples had compressive strengths that were not dissimilar to samples in which one or both of the admixtures were conventionally added.

TABLE 1

| Type of Addition | Compressive strength, psi | | | | |
|---|---|---|---|---|---|
| | 1 day | 3 days | 7 days | 9 days | 28 days |
| D-19 – Control | 2833 | 3710 | — | 4609 | 4915 |
| ADVA – Control | 3466 | 5300 | 5991 | 6149 | 6814 |
| Encapsulated DCI + ADVA (Convent.)[1] | 3161 | 5090 | — | 6246 | 7074 |
| A[2](replacing sand) | 2528 | 3928 | — | 4506 | 5033 |
| B[3](replacing sand) | 2545 | 4345 | — | 5298 | 5920 |
| C[4](replacing sand) | 2663 | 5665 (5 days) | — | 6093 | 6729 |
| D[5](replacing sand) | 3554 | 5556 | 6147 | — | 6880 |
| E[6](replacing sand) | 3617 | 5234 | 5664 | 6169 | 6855 |

[1]Conventional addition of ADVA in aqueous solution to the control mix
[2]A- Encapsulated DCI powder to which ADVA was impregnated; 14.5% CANI, 3.8% PAJ
[3]B- Encapsulated DCI powder to which a 1:1 mix of ADVA (31.5%):Eclipse was impregnated; 14.5% CANI, 1.9% of PAJ, 5.9% Eclipse
[4]C- Encapsulated DCI powder to which a mix of 0.175:1.000 of PAJ:Eclipse was impregnated; 14.5% CANI, 1.8% PAJ, 10.2% Eclipse
[5]D- DCI powder to which a mix of 1:2 of PAJ: Eclipse was impregnated; 4.4% PAJ and 8.8% Eclipse
[6]E- Control powder to which a mix of 1:2 of PAJ: Eclipse was impregnated; 4.4% PAJ and 8.8% Eclipse Thus, it was seen that the use of admixture-intermixed (or "encapsulated") particulates of the invention, even when coated with further admixture ("impregnated"), provided adequate compresssive strength figures in comparison to samples in which admixtures were conventionally added.

EXAMPLE 10

Two potential sources for the hydrated cement carrier are the cement-rich cake from concrete reclaimers or the mortar fraction from crushed waste concrete. These materials would be preferably dried before impregnation.

U.S. Pat. No. 5,039,556 teaches that considerable quantities of calcium nitrite solution can be impregnated into solid concrete that has been dried at temperatures exceeding 100° C. This application was for whole concrete in a structure. In this case the process could be significantly faster as it would be applied to crushed material without coarse aggregates which are generally not porous.

EXAMPLE 10

Another use envisioned by the inventors is to employ substantially hydrated, comminuted particles of the invention (using Portland cement, gypsum, or both as binder) as a hydration-water-containing aggregate for spray-applied fireproofing or shotcrete. Currently, bauxite is used in spray-applied fireproofing because it contains water and can be used as a substitute for sand. The use of hydrated cement-based particulates could provide a cheaper way of incorporating hydrated particles (which may even function as "hydration-water-containing" particles) into the fireproofing or shotcrete mixture. Optionally, admixtures such as shrinkage reduction admixtures, air control admixtures (entraining and/or detraining), water reducing admixtures (e.g., superplasticizers), and others may be intermixed into the cement and/or coated onto the substantially hydrated particulates. Thus further exemplary embodiments of the present invention include fireproofing or shotcrete compositions, commercially sold in dry powder form, which comprise at least one binder (e.g., Portland cement, gypsum, blast furnace slag, etc.) and a plurality of particulates in accordance with the invention. The particulates may comprise (by intermixing and/or coating) one or more admixtures for modifying a property of the composition.

The foregoing examples and embodiments are intended for illustrative purposes only and not for limiting the scope of the invention.

It is claimed:

1. A process comprising: intermixing a hydratable cementitious binder, at least one admixture in the amount of no less than 10% based on dry weight of cementitious binder and no greater than 95% based on dry weight of cementitious binder, said at least one admixture comprising a water reducer, superplasticizer, set retarder, set accelerator, air entraining admixture, air detraining admixture, shrinkage reducing admixture, corrosion inhibiting admixture, alkali reactivity reducer, permeability reducing admixture, bonding agent, pumping aid, gas former, colorant, grouting agent, dampproofing agent, biocide agent, or mixture thereof, and water to obtain a hydratable cementitious slurry; allowing said slurry to harden into a substantially hydrated mass; and comminuting the hardened mass into a plurality of particulates having an average particle diameter no less than 5 micrometers and having an average particle diameter no greater than 6 centimeters, said plurality of particulates thereby comprising at least one admixture in the amount of no less than 10% based on dry weight of cementitious binder and no greater than 95% based on dry weight of cementitious binder, said at least one admixture comprising a water reducer, superplasticizer, set retarder, set accelerator, air entraining admixture, air detraining admixture, shrinkage reducing admixture, corrosion inhibiting admixture, alkali reactivity reducer, permeability reducing admixture, bonding agent, pumping aid, gas former, colorant, grouting agent, dampproofing agent, biocide agent, or mixture thereof.

2. The process of claim 1 wherein said particulates have an average diameter no less than 10 micrometers and an average diameter not exceeding 250 micrometers.

3. The process of claim 1 wherein said hydratable cementitious binder comprises Portland cement, a blast furnace slag, or mixture thereof.

4. The process of claim 3 wherein said hydratable cementitious binder further comprises a further component selected from the group consisting of diatomaceous earth, limestone, clay, shale, fly ash, silica fume, or mixture thereof.

5. The process of claim 4 wherein said plurality of particulates comprise a corrosion inhibitor admixture that is intermixed within said particulates by intermixing prior to hydration and comminution of the hardened mass into the plurality of particulates.

6. The process of claim 5 wherein said corrosion inhibitor agent is calcium nitrite, calcium nitrate, or mixture thereof.

7. The process of claim 1 wherein at least one admixture is intermixed with said hydratable cementitious binder, prior to hardening into a substantially hydrated mass, in an admixture/binder ratio of 10–90:90–10%:based on dry solids of said binder.

8. The process of claim 7 wherein said at least one admixture is intermixed with said hydratable cementitious binder in an amount of at least 15% based on dry solids of said binder.

9. The process of claim 1 wherein further comprising at least two admixtures intermixed with said binder prior to hardening of said binder into a substantially hydrated mass.

10. The process of claim 1 further comprising coating said plurality of said substantially hydrated particulates with at least one admixture.

11. The process of claim 10 wherein said admixture comprises an polyoxyalkylene superplasticizer, a polyoxyalkylene shrinkage reduction admixture, or mixture thereof.

12. The process of claim 11 wherein said polyoxyalkylene superplasticizer, a polyoxyalkylene shrinkage reduction admixture, or mixture thereof is coated onto said plurality of substantially hydrated particulates using a solvent.

13. The process of claim 1 wherein calcium nitrite is intermixed with said cementitious binder prior to hardening of said binder into a substantially hydrated mass, and wherein, after comminuting said mass to obtain a plurality of particulates, said particulates are coated with another admixture.

14. The process of claim 1 wherein said plurality of comminuted substantially hydrated particulates have a loss on ignition of no less than 5% and a loss on ignition not greater than 45%, as determined in accordance with JIS R 5202.

15. The process of claim 14 wherein said loss on ignition is a loss on ignition is no less than 5% and no greater than 45%.

16. The process of claim 1, wherein said plurality of comminuted substantially hydrated particulates comprise at least one admixture, said process further comprising the step of introducing said particulates into a hardenable composition.

17. The process of claim 16 wherein said hardenable composition is a castable hydratable cementitious composition or a coating composition.

18. The process of claim 17 wherein said particulates are introduced into fresh concrete.

19. The process of claim 18 wherein said particulates are introduced into a coating composition.

20. The process of claim 19 wherein said particulates are introduced into a coating composition comprising an acrylic acid or salt thereof, an alkyd resin, an epoxy, a polyester, or mixture thereof.

21. The process of claim 17 further comprising introducing said plurality of said of comminuted substantially hydrated particulates into an epoxy coating operative to coat a metal.

22. The process of claim 21 further comprising coating said epoxy coating containing said particulates and admixture onto a metal.

23. The process of claim 22 wherein said metal is rebar.

24. A plurality of particulates made in accordance with the process of claim 1.

25. The process of claim 24 wherein said particulates have a granulose surface.

26. The particulates of wherein said particulates have a loss on ignition of no less than 5% and a loss on ignition no greater than 45%, as determined in accordance with JIS R 5202.

\* \* \* \* \*

UNITED STATES PATENT AND TRADEMARK OFFICE
CERTIFICATE OF CORRECTION

PATENT NO. : 6,648,962 B2  Page 1 of 1
DATED : November 18, 2003
INVENTOR(S) : Neal S. Berke et al.

It is certified that error appears in the above-identified patent and that said Letters Patent is hereby corrected as shown below:

<u>Column 6,</u>
Line 44, change "an" to -- can --

<u>Column 9,</u>
Line 61, change "treateed" to -- treated --

<u>Column 11,</u>
Line 13, change "granualr" to -- granular --

<u>Column 13,</u>
Line 16, change "composition.." to -- composition. --

<u>Column 15,</u>
Line 65, change "characterstics" to -- characteristics --

<u>Column 16,</u>
Line 24, change "outter" to -- outer --

<u>Column 18,</u>
Line 58, change "claim 18" to -- claim 17 --

Signed and Sealed this

Twenty-seventh Day of April, 2004

JON W. DUDAS
*Acting Director of the United States Patent and Trademark Office*